(12) United States Patent
Lindstrøm et al.

(10) Patent No.: US 12,489,170 B2
(45) Date of Patent: Dec. 2, 2025

(54) BATTERY MODULE AND BATTERY MODULE STACK

(71) Applicant: CORVUS ENERGY INC., Richmond (CA)

(72) Inventors: Jeremy Lindstrøm, Richmond (CA); Siu Lun Isaac Tang, Richmond (CA)

(73) Assignee: CORVUS ENERGY INC., Richmond (CA)

( * ) Notice: Subject to any disclaimer, the term of this patent is extended or adjusted under 35 U.S.C. 154(b) by 716 days.

(21) Appl. No.: 17/865,330

(22) Filed: Jul. 14, 2022

(65) Prior Publication Data

US 2024/0021950 A1 Jan. 18, 2024

(51) Int. Cl.
*H01M 50/296* (2021.01)
*H01M 50/204* (2021.01)
*H01M 50/264* (2021.01)
*H01M 50/503* (2021.01)
*H01M 50/51* (2021.01)

(52) U.S. Cl.
CPC ....... *H01M 50/296* (2021.01); *H01M 50/204* (2021.01); *H01M 50/264* (2021.01); *H01M 50/503* (2021.01); *H01M 50/51* (2021.01)

(58) Field of Classification Search
CPC ............. H01M 50/204; H01M 50/264; H01M 50/296; H01M 50/503; H01M 50/51
See application file for complete search history.

(56) References Cited

U.S. PATENT DOCUMENTS

| 2017/0110696 A1* | 4/2017 | Schoenherr ....... H01M 10/0525 |
| 2019/0237722 A1* | 8/2019 | Gao ..................... H01M 50/251 |
| 2022/0059896 A1 | 2/2022 | Pan et al. |

FOREIGN PATENT DOCUMENTS

| CN | 215496962 U | 1/2022 |
| WO | 2020/102909 A1 | 5/2020 |

OTHER PUBLICATIONS

International Search Report and Written Opinion mailed Oct. 25, 2023, directed to International Patent Application No. PCT/IB2023/057247; 9 pages.

* cited by examiner

*Primary Examiner* — Gregg Cantelmo
(74) *Attorney, Agent, or Firm* — Michele V. Frank; Venable LLP; Keith G. Haddaway

(57) ABSTRACT

A battery module and an intermediate module for use together in a stack of modules permit flexible electrical configurations of the stack. The battery module has multiple electrically conductive paths extending between top and bottom sides thereof, with one of the paths being connected in series with cells of the module, while at least one of the other paths acts as a pass-through that allows power or communications to pass through the battery module. The intermediate module also contains pass-through electrical paths that route power or communications from one battery module on one of the top or bottom sides of the intermediate module to the pass-through path of the battery module on the other of the top or bottom sides of the intermediate module. This allows the modules in a stack to be electrically connected together in different series-connected groups.

13 Claims, 12 Drawing Sheets

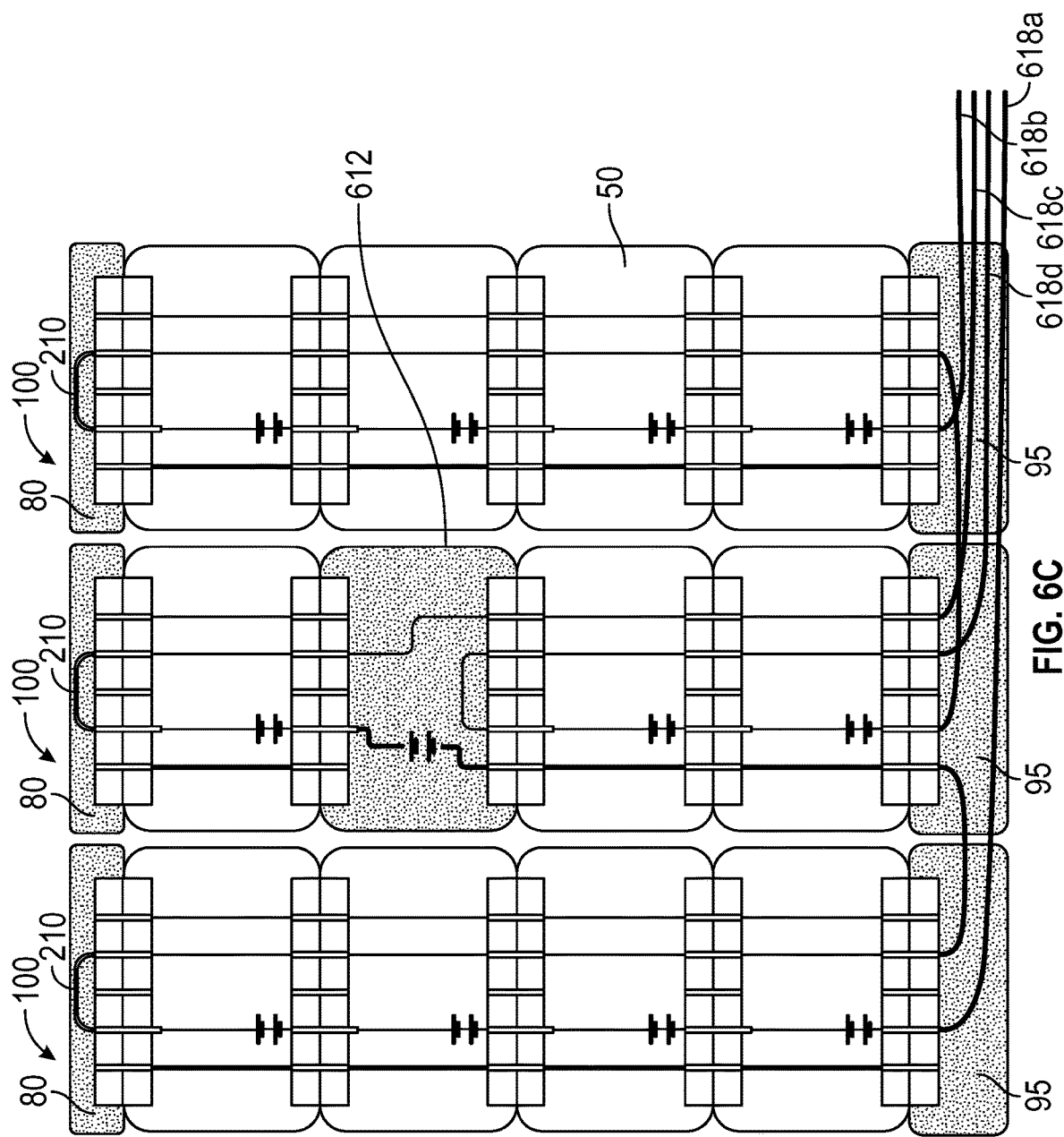

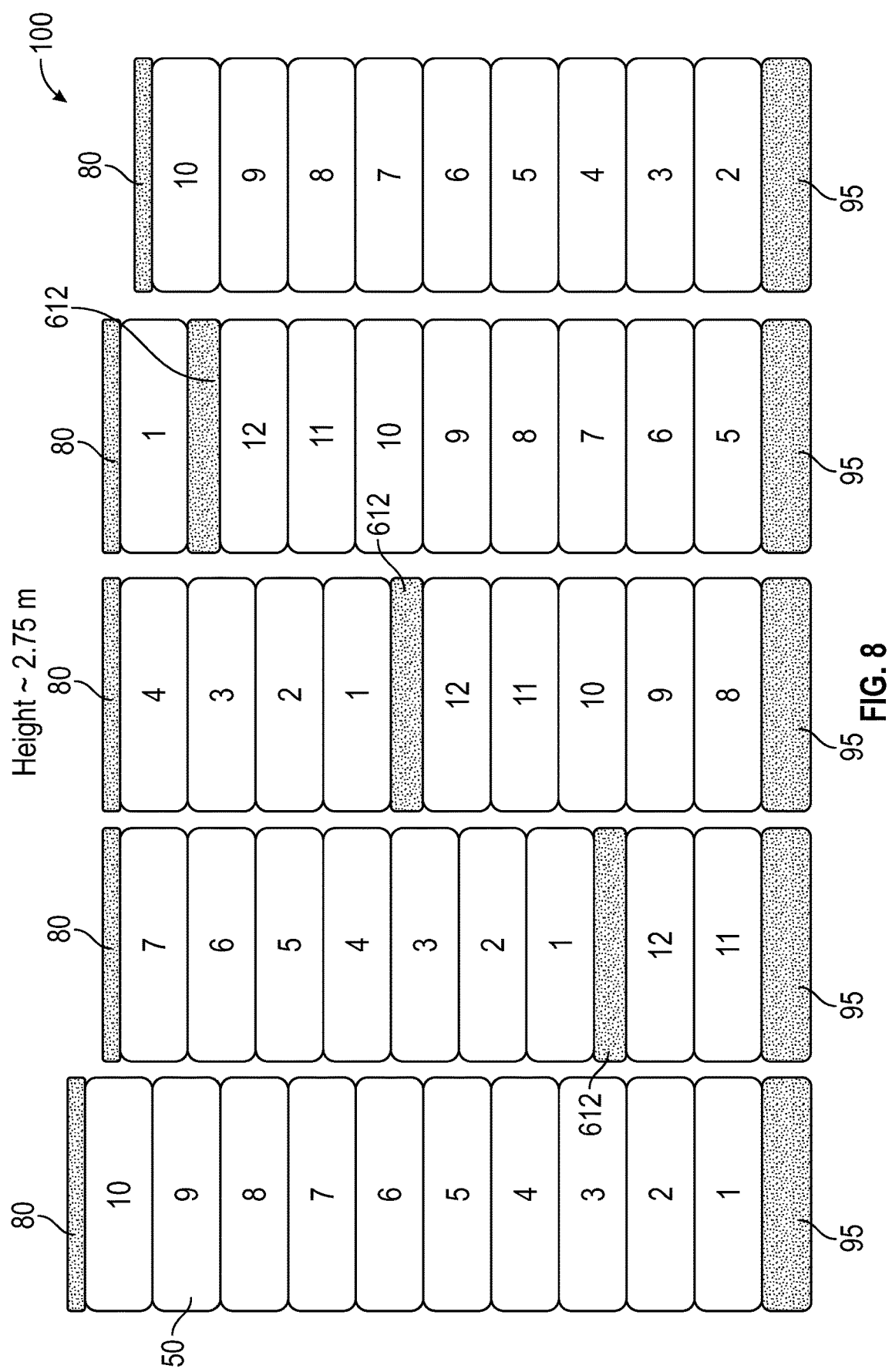

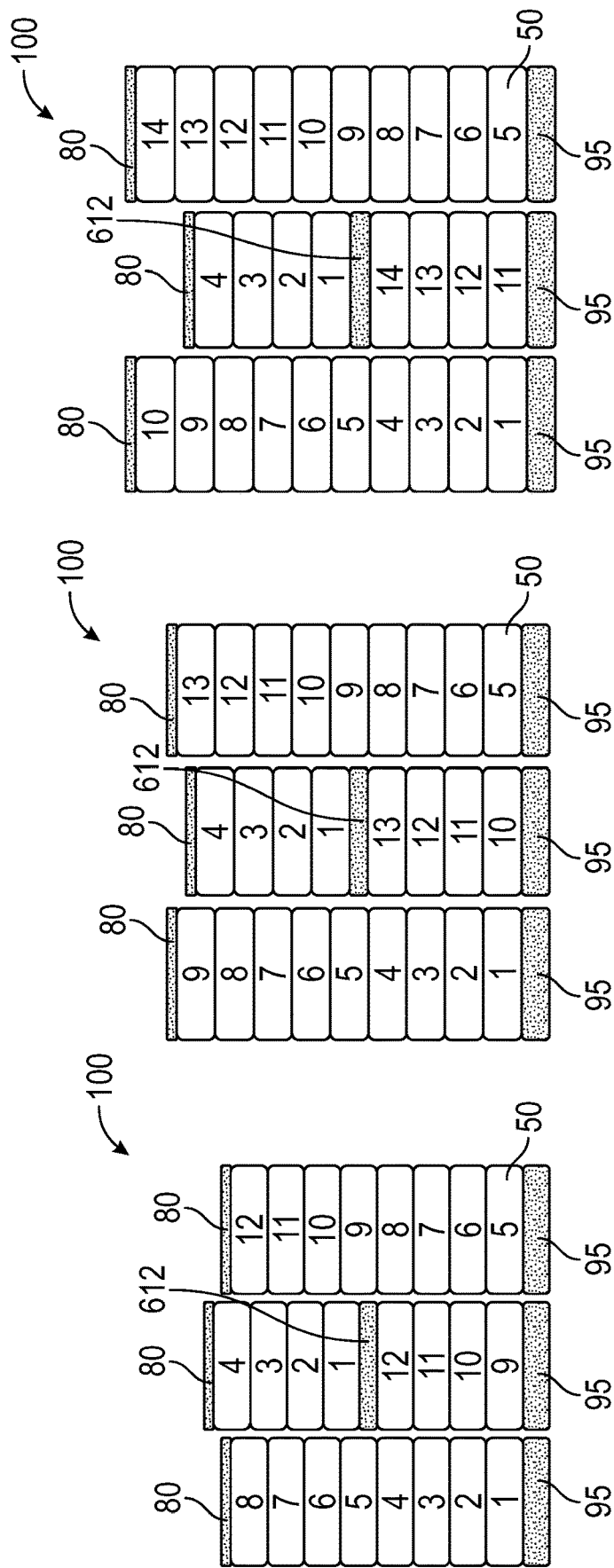

BATTERY MODULE AND BATTERY MODULE STACK

FIELD OF THE DISCLOSURE

The present disclosure relates to a battery module and to a battery module stack comprising multiple battery modules.

BACKGROUND TO THE DISCLOSURE

One type of rechargeable battery is a lithium-ion battery having a multiple-layered structure comprising a positive electrode activated by various mixed oxides or olivines, a negative electrode activated by special carbon, and a separator all immersed in an organic electrolyte. The battery is typically housed in an enclosure to form a battery module. During normal operating conditions, electrical energy is converted to and stored as chemical energy during charging, and stored chemical energy is converted to electrical energy during discharging. More particularly, during charging, lithium in the positive electrode is ionized and moves from layer to layer to the negative electrode; during discharging, the ions move to the positive electrode and return to its original compound. Multiple lithium-ion battery modules can be mounted on a rack assembly, together with a control module for controlling the battery modules, to form a battery pack.

Various different types of racks may be used for storing and transporting interconnected battery modules. In its simplest form, a rack may comprise a framework with a number of bays into which the battery modules are inserted. Power and cooling lines may then be connected to the battery modules. In another variation, a rack may include a backplane that houses the power connections. A battery module, with its power connectors at the rear of the module, is inserted into a bay and plugged directly into the backplane.

However, in general the use of a rack complicates the battery pack. For example, using a rack to house battery modules increases the number of components that form the battery pack, increasing the pack's manufacturing costs. In addition, racks that employ a backplane may be prone to alignment issues arising between the battery module's power connectors and the backplane's power lines.

There therefore remains a need in the art to provide a battery module that enables simpler and more efficient storing and transporting of multiple interconnected battery modules.

SUMMARY OF THE DISCLOSURE

According to a first aspect, there is provided a battery module comprising: a housing comprising opposing top and bottom sides; battery cells contained within the housing and electrically connected to each other; first and second top electrical contacts located on the top side; first and second bottom electrical contacts located on the bottom side; and first and second electrically conductive paths respectively terminating at the first top and bottom electrical contacts and at the second top and bottom electrical contacts, wherein the first electrically conductive path is electrically connected in series to the battery cells.

The battery module may further comprise a third top electrical contact located on the top side, a third bottom electrical contact located on the bottom side, and a third electrically conductive path terminating at the third top and bottom electrical contacts.

The battery module may further comprise a fourth top electrical contact located on the top side, a fourth bottom electrical contact located on the bottom side, and a fourth electrically conductive path terminating at the fourth top and bottom electrical contacts.

The housing may be electrically conductive and the battery module may further comprise a fifth top electrical contact located on the top side, with each of the fifth top and bottom contacts being electrically connected to the housing.

The battery module may further comprise a fifth electrically conductive path terminating at the fifth top and bottom contacts.

The battery module may further comprise a male connector on one of the top and bottom sides of the module and a female connector on the other of the top and bottom sides of the module, with at least one of the top contacts terminating at the connector on the top side of the module and at least one of the bottom contacts terminating at the connector on the bottom side of the module.

All of the top contacts may terminate at the connector on the top side of the module and all of the bottom contacts may terminate at the connector on the bottom side of the module.

According to another aspect, there is provided an intermediate module for electrically connecting a top battery module such as that recited in any one or more of the above aspects with a bottom battery module such as that recited in any one or more of the above aspects when the intermediate module is stacked between the top and bottom battery modules. The intermediate module comprises: a housing comprising opposing top and bottom sides; first and second top electrical contacts located on the top side; first and second bottom electrical contacts located on the bottom side; and first and second electrically conductive paths respectively terminating at the first top and bottom electrical contacts and at the second top and bottom electrical contacts, wherein the first top electrical contact of the intermediate module is positioned to contact the first bottom electrical contact of the top battery module, the first bottom electrical contact of the intermediate module is positioned to contact the third top electrical contact of the bottom battery module, the second top electrical contact of the intermediate module is positioned to contact the second bottom electrical contact of the top battery module, and the second bottom electrical contact is positioned to contact the fourth top electrical contact of the bottom battery module. The intermediate module may contain battery cells connected electrically in series as part of the first electrically conductive path.

The intermediate module may further comprise: third and fourth bottom electrical contacts located on the bottom side; and a third electrically conductive path terminating at the third and fourth bottom electrical contacts, with the third bottom electrical contact of the intermediate module being positioned to contact the first top electrical contact of the bottom battery module, and the fourth bottom electrical contact of the intermediate module being positioned to contact the second top electrical contact of the bottom battery module.

The intermediate module may further comprise a male connector on one of the top and bottom sides of the intermediate module and a female connector on the other of the top and bottom sides of the intermediate module, with at least one of the top contacts of the intermediate module terminating at the connector on the top side of the intermediate module and at least one of the bottom contacts of the intermediate module terminating at the connector on the bottom side of the intermediate module.

All of the top contacts of the intermediate module may terminate at the connector on the top side of the intermediate module and all of the bottom contacts of the intermediate module may terminate at the connector on the bottom side of the intermediate module.

According to another aspect, there is provided a stack of battery modules, comprising: a top battery module such as that recited in any one or more of the above aspects; a bottom battery module such as that recited in any one or more of the above aspects; and an intermediate module stacked between the top and bottom battery modules, the intermediate module comprising: a housing comprising opposing top and bottom sides; first and second top electrical contacts located on the top side; first and second bottom electrical contacts located on the bottom side; and first and second electrically conductive paths respectively terminating at the first top and bottom electrical contacts and at the second top and bottom electrical contacts, wherein the first top electrical contact of the intermediate module is positioned to contact the first bottom electrical contact of the top battery module, the first bottom electrical contact of the intermediate module is positioned to contact the third top electrical contact of the bottom battery module, the second top electrical contact of the intermediate module is positioned to contact the second bottom electrical contact of the top battery module, and the second bottom electrical contact is positioned to contact the fourth top electrical contact of the bottom battery module. The intermediate module may contain battery cells connected electrically in series as part of the first electrically conductive path.

The intermediate module may further comprise: third and fourth bottom electrical contacts located on the bottom side; and a third electrically conductive path terminating at the third and fourth bottom electrical contacts, with the third bottom electrical contact of the intermediate module being positioned to contact the first top electrical contact of the bottom battery module, and the fourth bottom electrical contact of the intermediate module being positioned to contact the second top electrical contact of the bottom battery module.

The intermediate module may further comprise a male connector on one of the top and bottom sides of the intermediate module and a female connector on the other of the top and bottom sides of the intermediate module, with at least one of the top contacts of the intermediate module terminating at the connector on the top side of the intermediate module and at least one of the bottom contacts of the intermediate module terminating at the connector on the bottom side of the intermediate module.

All of the top contacts of the intermediate module may terminate at the connector on the top side of the intermediate module and all of the bottom contacts of the intermediate module may terminate at the connector on the bottom side of the intermediate module.

According to another aspect, there is provided a battery module comprising: a housing; battery cells contained within the housing and electrically connected to each other; first and second electrical contacts located on a first side of the housing; first and second electrical contacts located on a second side of the housing; and first and second electrically conductive paths respectively terminating at the first electrical contacts and at the second electrical contacts, wherein the first electrically conductive path is electrically connected in series to the battery cells.

The first side of the housing may be a top side, the first and second electrical contacts located on the first side of the housing may be first and second top electrical contacts, the second side of the housing may be a bottom side, and the first and second electrical contacts located on the bottom side of the housing may be first and second bottom electrical contacts.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

Embodiments of the disclosure will now be described in conjunction with the accompanying drawings of which:

FIG. 6C depicts example battery stacks comprising the battery modules of FIGS. 6A and 6B;

FIGS. 8 and 9A-9C depict various example configurations of stacks comprising the battery modules of FIGS. 6A and 6B;

DETAILED DESCRIPTION OF EMBODIMENTS

The present disclosure seeks to provide improved battery modules and battery packs. While various embodiments of the disclosure are described below, the disclosure is not limited to these embodiments, and variations of these embodiments may well fall within the scope of the disclosure which is to be limited only by the appended claims.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

In what follows, a battery module refers generally to an enclosure housing multiple interconnected battery cells. The battery cells form one or more battery cells stacks (which may also be referred to as battery cell strings). Multiple battery modules stacked on top of one another form generally a battery module stack (or simply a module stack). When one or more battery modules are connected to a pack controller, the combination of battery module(s) and module controller forms generally a battery pack. The pack controller may be stacked with a battery module stack, or may located outside of the module stack.

Figure 1:
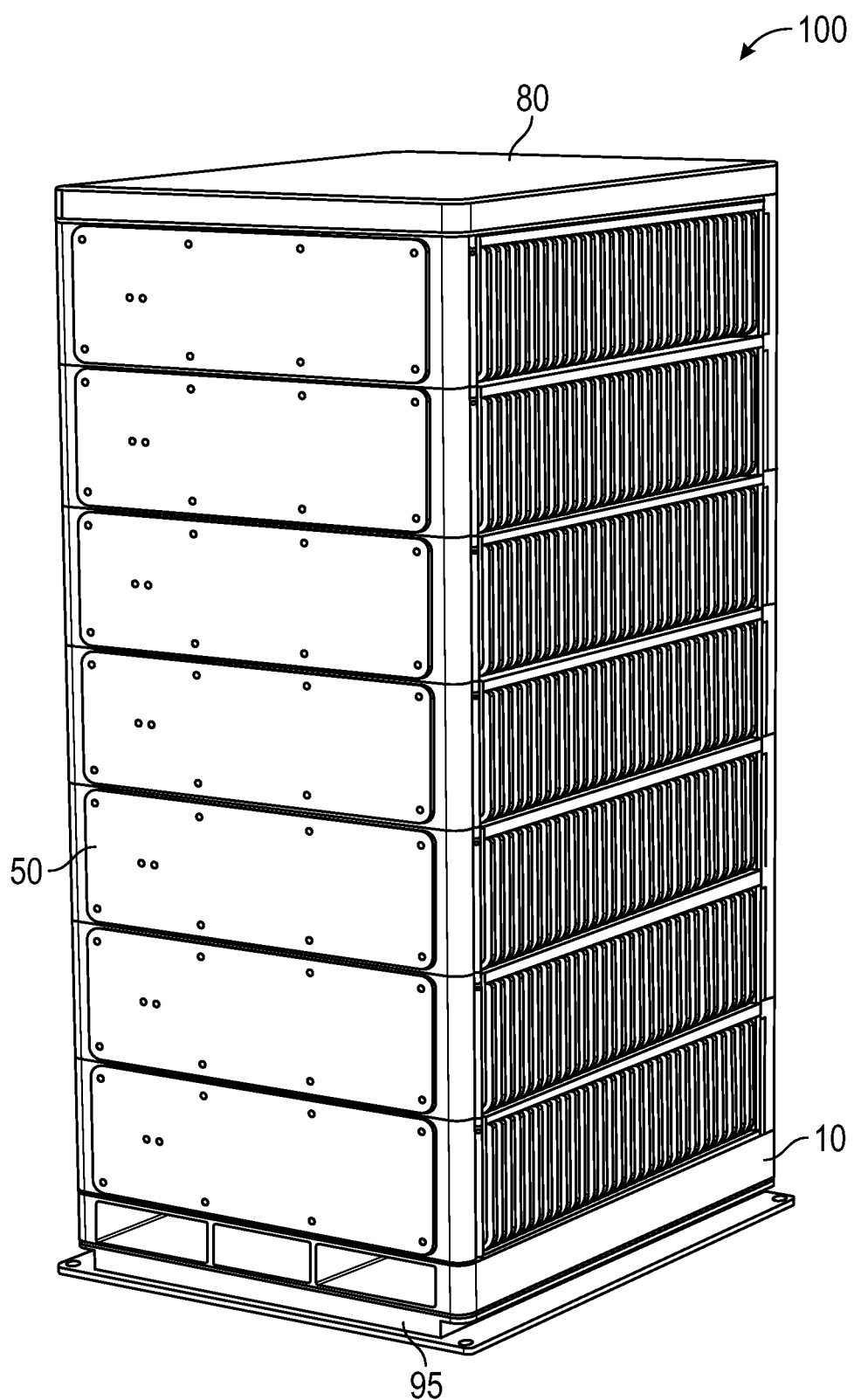
FIG. 1 shows a battery module stack according to example embodiments.

Turning to FIG. 1, there is shown a battery module stack 100 according to an embodiment of the disclosure. Module stack 100 is formed of a stacked arrangement of different components. In particular, module stack 100 comprises a module stack base 10 at a bottom thereof, a stack of interconnected battery modules 50 stacked on top of module stack base 10, and a module stack cover 80 positioned at the top of module stack 100, directly adjacent the uppermost battery module 50. Module stack 100 is stacked on top of an interface base 95, such that module stack base 10 engages with an upper surface of interface base 95. It will be understood by the skilled person that the disclosure extends to battery packs with any number of stacked battery modules and any number of columns of stacked battery modules. Furthermore, in some embodiments the module stack may be formed without module stack cover 80 and/or without module stack base 10. Therefore, in some embodiments the module stack may comprise of only one or more columns of stacked battery modules.

The footprint of module stack 100 is roughly the same as that of a standard-size pallet. In particular, the footprint of module stack 100 is roughly the same a standard EUR 2 European-size pallet, as defined by the European Pallet Association (e.g. 1,200×1,000×144 millimetres), although as would be recognized by the skilled person the disclosure extends to module stacks with any other suitable footprint size.

Figure 2:
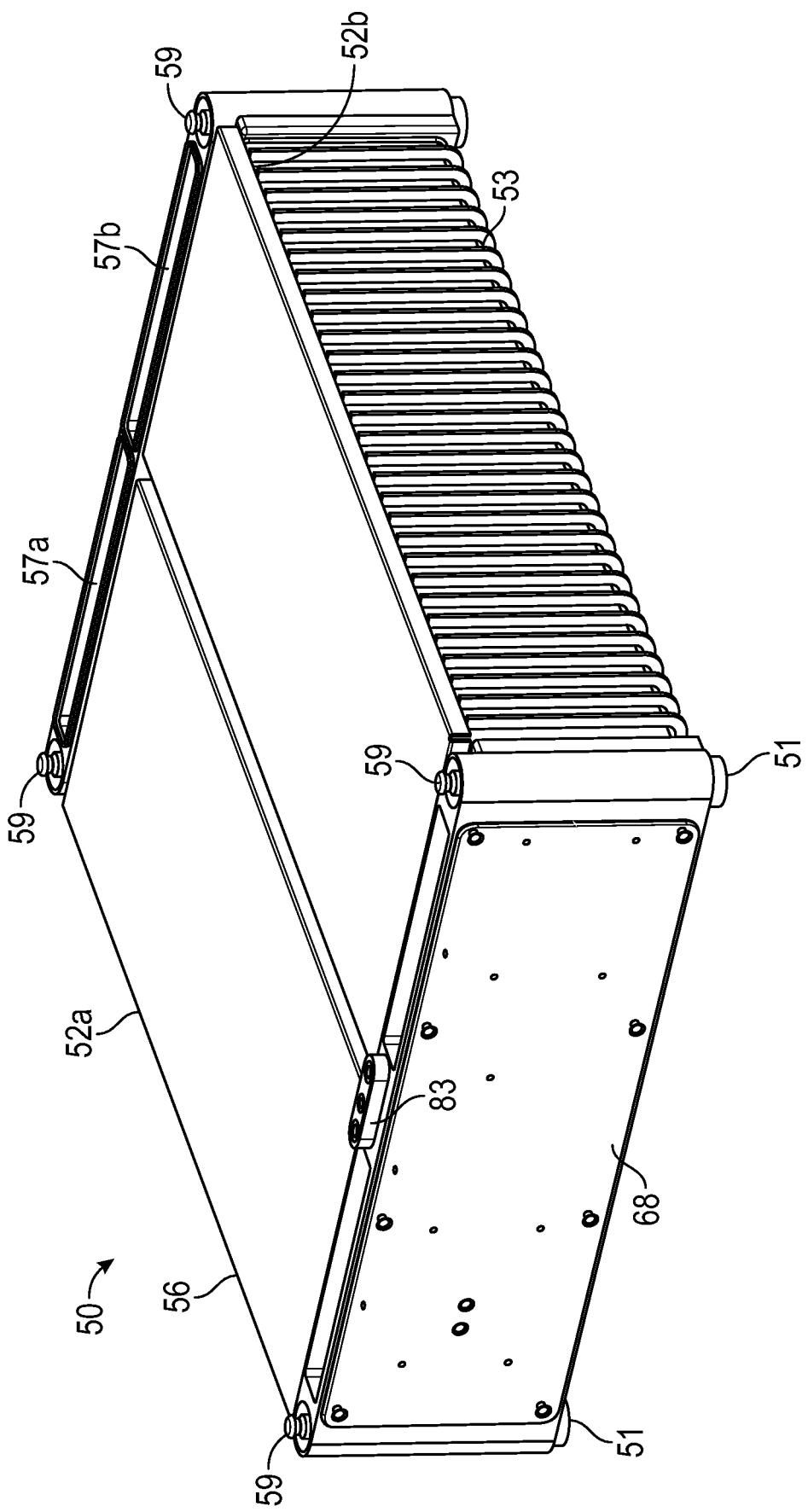
FIG. 2 shows a top of a battery module according to example embodiments.
Figure 3:
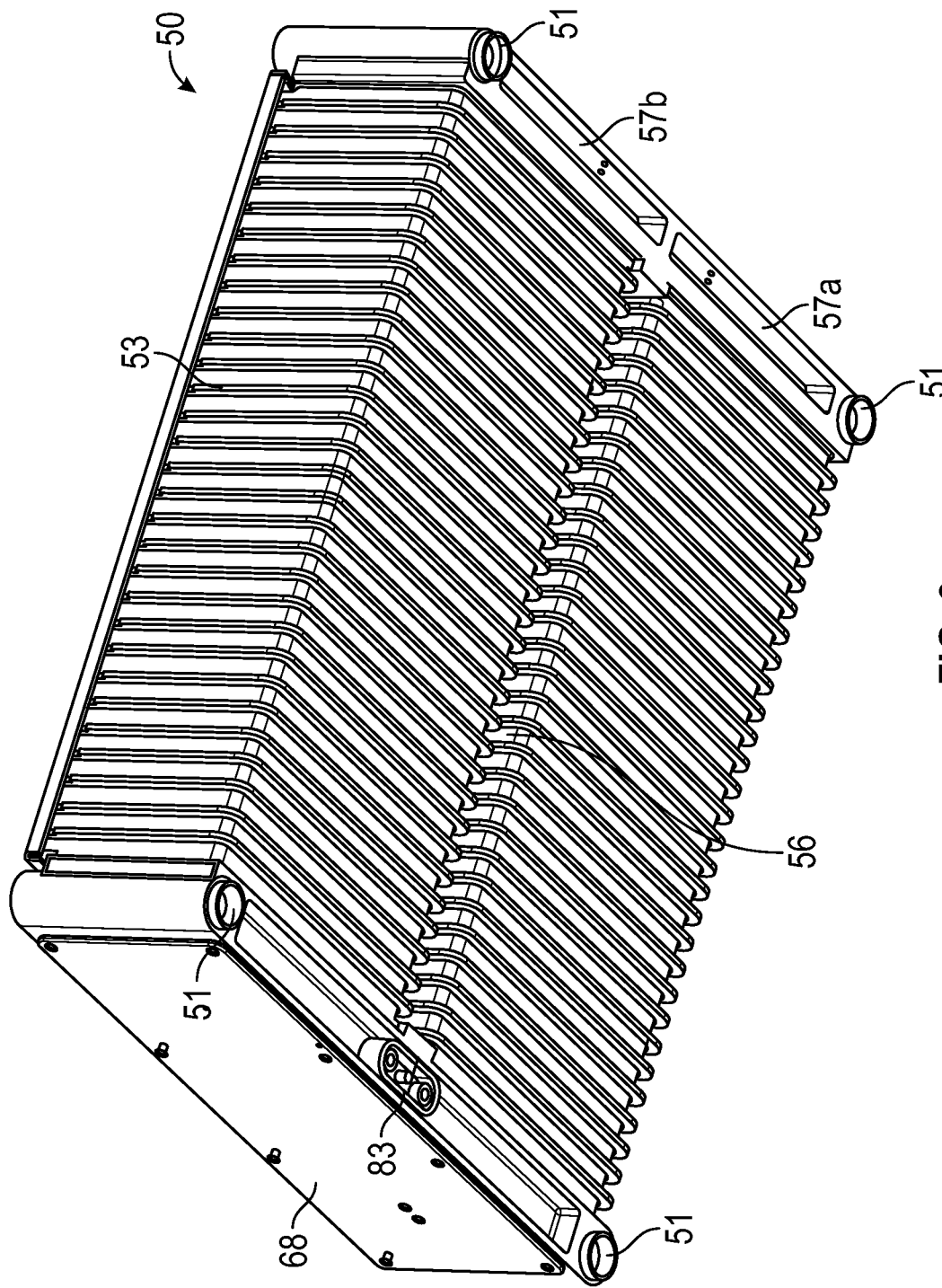
FIG. 3 shows a bottom of the battery module of FIG. 2.

Turning to FIGS. 2 and 3, there are shown top and bottom views of a battery module 50. Battery module 50 comprises a pair of cell enclosures 52a, 52b each housing a battery cell stack (not shown). The left, right, and lower sides of cell enclosures 52a, 52b facing away from battery module 50 are provided with cooling fins 53 for facilitating heat transfer from the interior of cell enclosures 52a, 52b to the exterior of battery module 50.

At a rear of battery module 50 is provided an exhaust assembly comprising a pair of exhaust channels 57a, 57b. Exhaust channels 57a, 57b extend from exhaust apertures formed within the underside and the upper side of battery module 50. Therefore, exhaust channels 57a, 57b extend from the underside of battery module 50 to the upper side of battery module 50. Exhaust channels 57a, 57b are used to convey exhaust gases that may have formed within cell enclosures 52a, 52b (for example, in response to one or more of battery cell stacks undergoing thermal runaway) away from battery module 50. In particular, each exhaust channel 57a, 57b is fluidly coupled to an interior of one of cell enclosures 52a, 52b such that exhaust gases emanating from one of battery cell stacks within the cell enclosure may be directed away from battery module 50.

Extending between cells enclosures 52a, 52b is a cooling assembly comprising a cooling channel 56. Cooling channel 56 extends from a cooling aperture formed within each of the underside and the upper side of battery module 50. Therefore, cooling channel 56 extends from the underside of battery module 50 to the upper side of battery module 50. Cooling channel 56 is used to convey a cooling fluid between cell enclosures 52a, 52b. Cooling channel 56 extends substantially along the entire length of cell enclosures 52a, 52b and is separated from exhaust channels 57a, 57b by a physical interface such that a cooling fluid flowing through cooling channel 56 does not mix with exhaust gases flowing through exhaust channels 57a, 57b. The cooling fluid may include, for example, a liquid coolant, forced airflow (e.g. chilled air forced upwardly or downwardly through battery module 50, via cooling channel 56), or passive airflow (e.g. air flowing through battery module 50, via cooling channel 56, by free convection).

When two or more such battery modules 50 are stacked with one another, cooling channel 56 of one battery module 50 is aligned with cooling channel 56 of adjacent battery modules 50. In addition, exhaust channels 57a, 57b of one battery module 50 are aligned with exhaust channels 57a, 57b of adjacent battery modules 50.

In some embodiments, exhaust channels 57a, 57b and cooling channel 56 may be located elsewhere on battery module 50. For example, a cooling channel may be provided along each side of battery module 50 that faces away from battery module 50. As another example, battery module 50 may include a single exhaust channel servicing both cell enclosures 52a and 52b. The skilled person will recognize that any number of cooling channels and exhaust channels may be included in battery module 50, and that their number may be varied according to the desires of the skilled person, provided that the cooling channel(s) and exhaust channel(s) extend through battery module 50, from one side of battery module 50 to another side of battery module 50.

The module 50 has a number of male or female self-locking members 59. The self-locking members 59 are configured to engage or mate with corresponding self-locking members 51 provided in the underside of another battery module 50. Each self-locking member 51 comprises a tapered portion to facilitate engagement with a mating self-locking member 59 of an adjacently disposed battery module 50. The tapered portions allow a certain tolerance of misalignment between the battery modules 50, such that the battery modules 50 may more easily "self-align" when being engaged with one another.

Power connectors 83 are provided at a front of battery module 50, one each of an upper side and an under side thereof. Power connectors 83 comprise a pair of conductive pins and a ground connection. The conductive pins may be retractable, as described in connection with power pins 67 of FIGS. 24A and 24B. Each power connector 83 comprises a tapered portion to facilitate engagement with a power connector 83 of an adjacently disposed battery module 50. Thus, the male power connector 83 on the top of battery module 50 comprises a tapered portion for facilitating engagement with a tapered female power connector 83 on an underside of an upper, adjacently disposed battery module 50. The tapered portions allow a certain tolerance of misalignment between the battery modules 50, such that the battery modules 50 may more easily "self-align" when being engaged with one another.

In conjunction with the tapered portions on one or both of male and female power connectors 83, power connectors 83 may be allowed to "float" with respect to cell enclosures 52a and 52b, to provide additional tolerance when power connectors 83 of battery module 50 are mated with power connectors 83 of adjacent battery modules.

Turning to FIGS. 4A-4D, there are shown various example ways in which the battery modules 50 of a battery module stack 100 may be interconnected.

Figure 4:
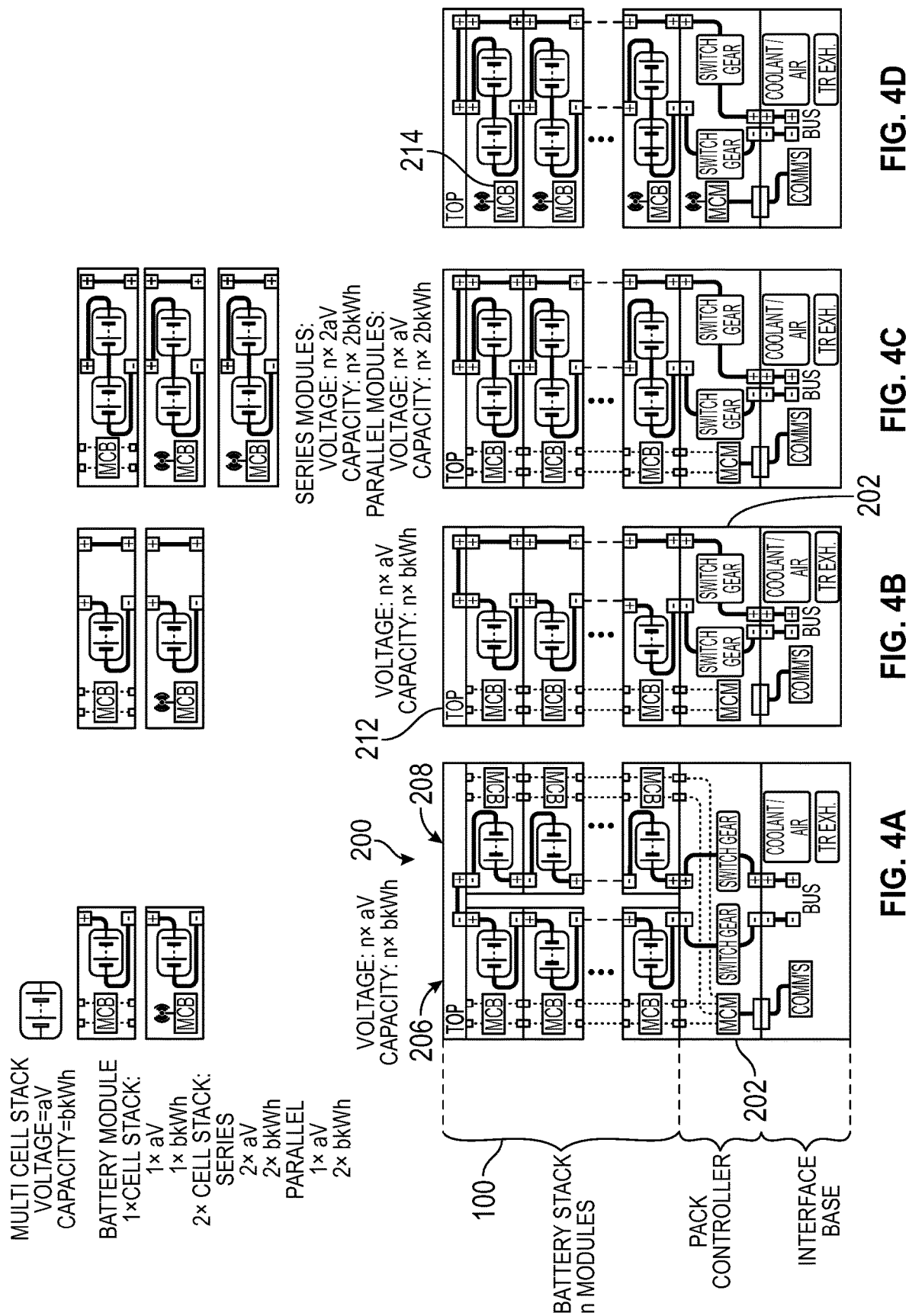
FIGS. 4A-4D and 5 show circuit diagrams of interconnected battery modules, according to example embodiments.

FIG. 4A depicts a battery pack 200 wherein a pack controller 202 is integrated with the module stack 100. In particular, FIG. 4A shows a first, left-hand column 206 of battery modules positioned adjacent a right-hand column 208 of battery modules. The orientation of the battery modules in right-hand column 208 is flipped relative to that of the battery modules in left-hand column 206, such that power connections on one column are provided adjacent to power connections on the other column, thereby minimizing the electrical path length of the string of battery modules.

FIG. 4B depicts an alternative, example setup with a single column of interconnected battery modules. A return conductive path 210 is provided from a cover 212 back to the pack controller 202. FIG. 4C shows another similar setup with a single column of interconnected battery modules. However, each battery module 50 includes two adjacent stacks of battery cells (similarly to the embodiment of FIG. 2). FIG. 4D shows a setup that is identical to that of FIG. 4C except that, instead of optical communication ports, wireless communication transceivers or modules 214 are used to enable communication between battery modules. As mentioned above, a hardwired connection may instead be used for communication.

Figure 5:
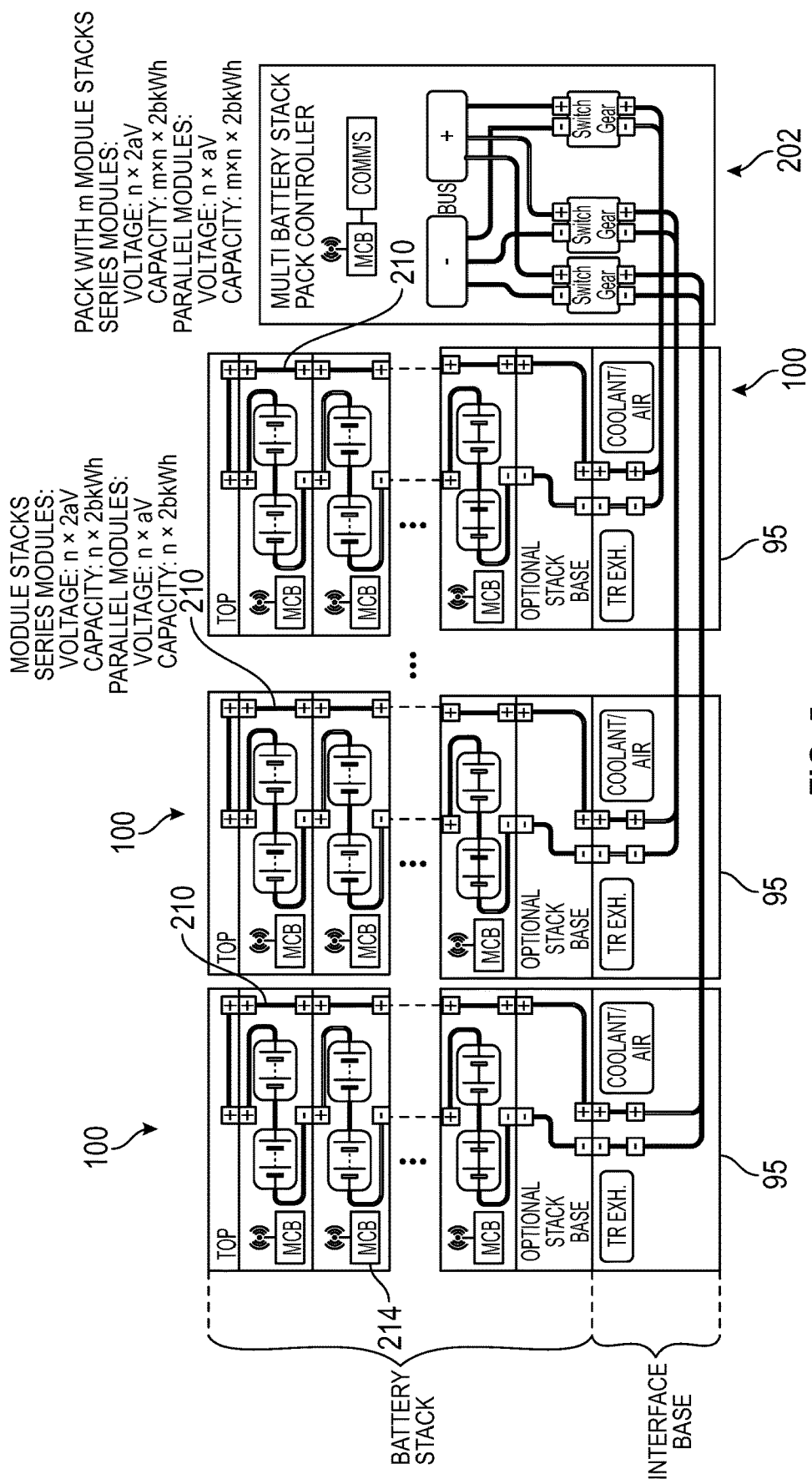

FIG. 5 shows an alternative configuration comprising multiple module stacks 100 and a single pack controller 202 configured to control module stacks 100. Each battery module comprises two battery cell stacks. A return conductive path 210 connects the top of each module stack 100 to an interface base 95, whereupon the electrical path is directed to pack controller 202. Wireless communication transceivers or modules 214 are used to provide communication between the battery modules 50. In some embodiments, two or more module stacks 100 can be connected in series before being connecting to pack controller 202, thereby providing improved configurability for the height and footprint of the battery pack.

Split Stack

Figure 6A:
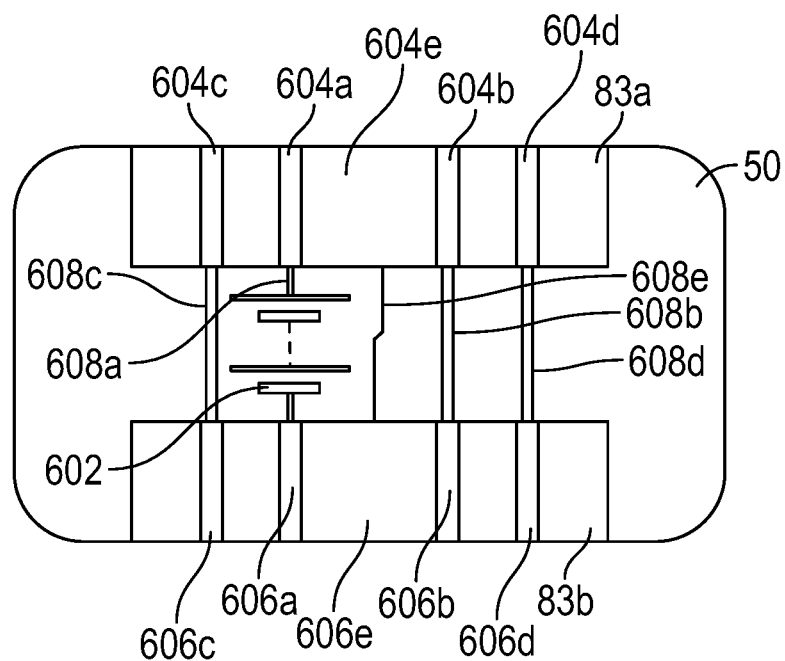
FIG. 6A depicts a schematic of a battery module, according to another example embodiment.
Figure 6B:
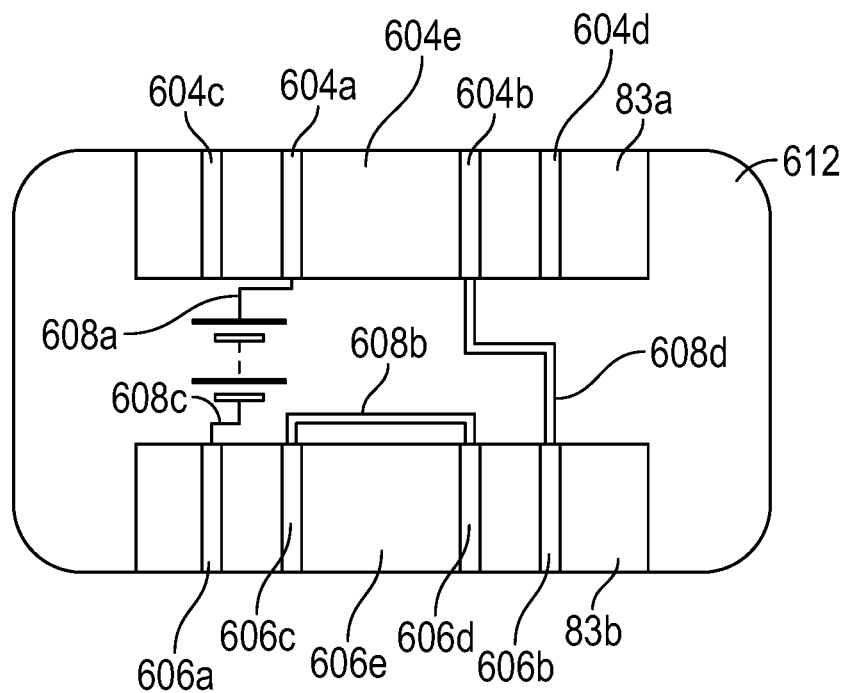
FIG. 6B depicts an example of an intermediate battery module, according to another example embodiment.

Referring now to FIGS. 6A and 6B, there are shown example schematics of the battery module 50 and of an intermediate module 612 that may be used to assemble a collection of battery module stacks 100 that collectively have a higher energy density than that of an analogous collection of battery module stacks 100 assembled without the intermediate module 612.

Figure 7:
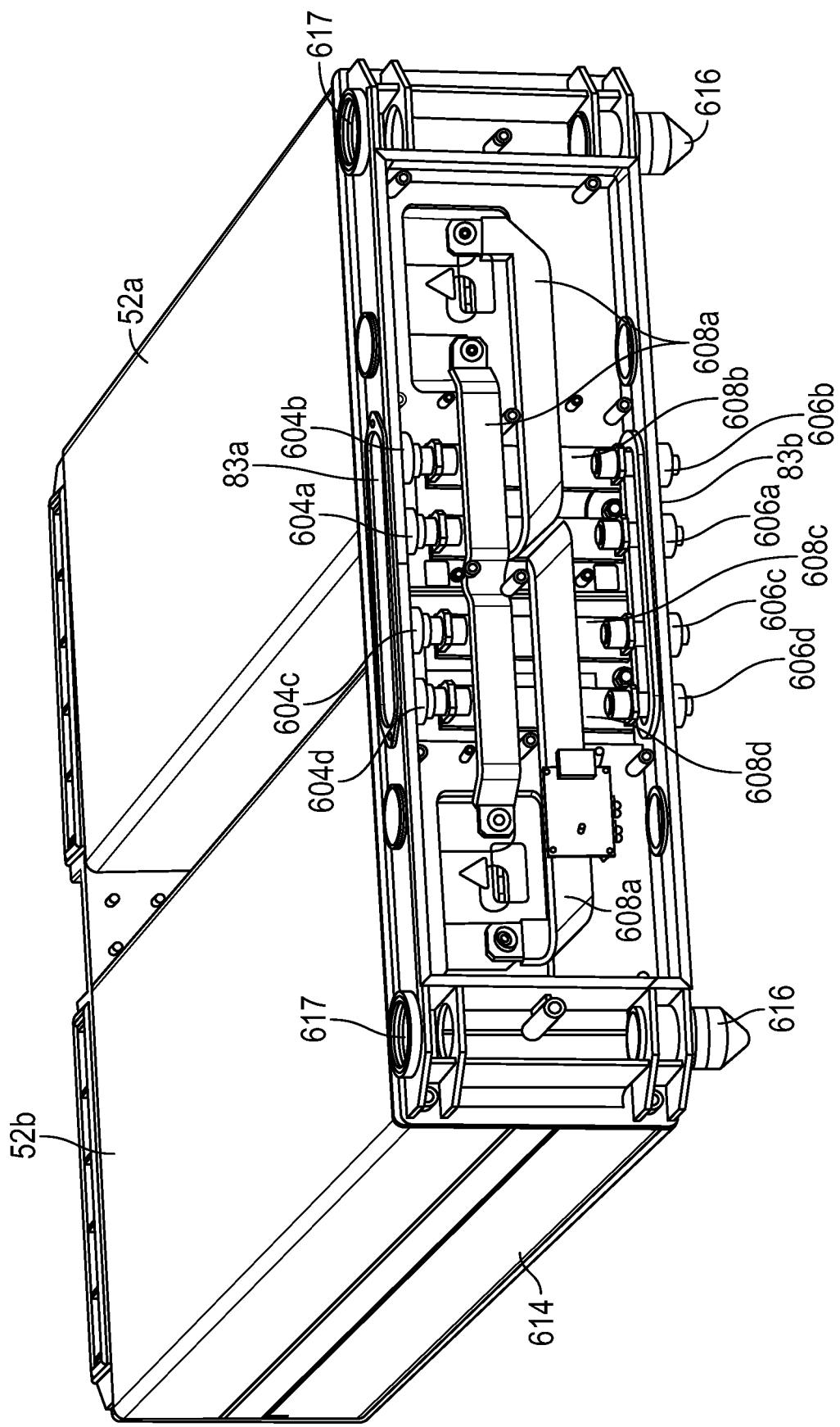
FIG. 7 depicts an example battery module showing various electrically conductive paths extending between the top and bottom of the module, according to another example embodiment.

The module 50 of FIG. 6A comprises a module housing 614 (shown in FIG. 7). In at least some embodiments the housing 614 comprises the cell enclosures 52a,b and a module chassis, with the module chassis providing support for the cell enclosures 52a,b and acting as the front, rear, left, and right side walls of the housing 614, as depicted in FIG. 7. On a top side of the housing 614 is a top power connector 83a and at a corresponding location on the bottom side of the housing 614 is a bottom power connector 83b. One of the top and bottom power connectors 83a,b is a male connector and the other of the top and bottom power connectors 83a,b is a female connector. This allows a number of the modules 50 to be stacked on top of each other, with the top power connector 83a of a first of the modules 50 mating with the bottom power connector 83b of a second of the modules 50, with the second of the modules 50 resting on the top surface of the first of the modules 50.

The top power connector 83a of the module 50 of FIG. 6A comprises first through fifth top electrical contacts 604a-e, which are respectively connected in series via first through fifth electrically conductive paths 608a-e with first through fifth bottom electrical contacts 606a-e that comprise part of the bottom power connector 83b. The first through fifth electrically conductive paths 608a-e accordingly respectively terminate at the first through fifth top electrical contacts 604a-e and the first through fifth bottom electrical contacts 606a-e. The first electrically conductive path 608a is in series with the battery cells 602 that comprise part of the module 50. The fifth electrically conductive path 608e and contacts 604e, 606e are for bonding the housings 614 of the modules 50 together in order to reduce the likelihood of electric shock. Accordingly, the housing 614 is electrically conductive and shorted to the fifth electrically conductive path 608e and contacts 604e, 606e. In at least some different example embodiments, connectors 83a,b may comprise different combinations of contacts. For example, the connectors 83a,b may comprise one or both of a ground electrical contact that is connected to ground, and a contact used for wired communication between the modules 50; these contacts may be in addition to or in place of at least some of the first through fifth top and bottom electrical contacts 604a-e, 606a-e.

The second through fourth paths 608b-d may accordingly act as bypass paths that allow power and/or signals to be routed through the module 50. While these paths 608b-d are shown as electrical shorts in FIG. 6A, in at least some different example embodiments circuitry having a non-zero impedance may be placed along one of more of the paths 608b-d.

FIG. 7 depicts a front perspective view of an example embodiment of the module 50 with the module's 50 rear plate removed to reveal underlying electrical connections. The top and bottom power connectors 83a,b are visible in FIG. 7; in contrast to the example embodiment of the module 50 shown in FIG. 6A, in FIG. 7 the fifth top and bottom electrical contacts 604e, 606e do not comprise part of the power connectors 83a,b. Rather, the fifth top and bottom electrical contacts 604e, 606e are replaced with electrically conductive bond pins 616 directly connected to the module's 50 housing 614 and positioned such when two of the modules 50 are stacked together, the bond pins 616 on the bottom side of the top one of the modules 50 are received by corresponding receptacles 617 on the top side of the other of the modules 50, thereby electrically shorting the housings 614 together.

One example embodiment has the first through fourth top electrical contacts 604a-d located in the top power connector 83a and the first through fourth bottom electrical contacts 606a-d located in the bottom power connector 83a in the module 50 of FIG. 7. The second through fourth electrically conductive paths 608b-d are bus bars that directly connect the second through fourth top and bottom electrical contacts 604b-d, 606b-d, respectively. Only a portion of the first electrically conductive path 608a is visible in FIG. 7. This visible portion comprises a first bus bar that extends downwards from the first top electrical contact 604a and is fastened adjacent to one of the cell enclosures 52a so as to connect to the cells 602 therein, a second bus bar that extends horizontally and connects the cells 602 in the two cell enclosures 52a,b together, and a third bus bar that is fastened adjacent to the other of the cell enclosures 52b so as to connect the cells 602 therein to the first bottom electrical contact 606a. The first electrically conductive path 608a accordingly connects the first top and bottom electrical contacts 604a, 606a with the battery cells 602 in the cell enclosures 52a,b.

The intermediate module 612 of FIG. 6B has a housing 614, top and bottom power connectors 83a,b, first through fifth top electrical contacts 604a-e, and first through fifth bottom electrical contacts 606a-e similar to those of the module 50 of FIG. 6A. However, instead of having five electrically conductive paths 608a-e as the module 50 of FIG. 6A does, the intermediate module 612 of FIG. 6B has only four electrically conductive paths 608a-d. The first electrically conductive paths 608a connects the first top electrical contacts 604a on the top side of the intermediate module 612 in series with a number of cells, and then in series with the third electrically conductive path 608c, and terminates at the first bottom electrical contacts 606a on the bottom side of the intermediate module 612.

The fourth electrically conductive paths 608d terminate at the second top electrical contacts 604b on the top side of the intermediate module 612 and at the second bottom electrical contacts 606b on the bottom side of the intermediate module 612. The first and second top electrical contacts 604a,b and the first and second bottom electrical contacts 606a,b are positioned such that when the intermediate module 612 is stacked between a first module 50 (on the top side of the intermediate module 612) and a second module 50 (on the bottom side of the intermediate module 612) of the type depicted in FIG. 6A, the first bottom electrical contact 606a of the first module 50 contacts the first top electrical contact 604a of the intermediate module 612, the first bottom electrical contact 606a of the intermediate module 612 contacts the third top contact 604c of the bottom module 50, the second bottom electrical contact 606b of the first module 50 contacts the second top electrical contact 604b of the top module 50, and the second bottom electrical contact 606b of the intermediate module contacts the fourth top electrical contact 604d of the bottom module 50. Consequently, by using the intermediate module 612, the first electrically conductive path 602a (which is in series with the cells 602) of the first module 50 is routed to the third electrically conductive path 608c of the bottom module 50. If the first module 50 were directly on top of the second module 50, the first electrically conductive paths 608a of the first and second modules 50 would be in series. Analogously, by using the intermediate module 612, the second electrically conductive path 608b of the first module 50 is routed to the fourth electrically conductive path 608d of the second module 50. If the first module 50 were directly on top of the second module 50, the second electrically conductive paths 608b of the first and second modules 50 would be in series. This path re-rerouting allows power density to be increased when the modules 50, 612 are deployed, as discussed further below. As with the module 50 of FIG. 7, bus bars may also be used for the electrically conductive paths 608a-e of the intermediate module 612.

FIG. 6C depicts three stacks 100: a leftmost stack 100, a center stack 100, and a rightmost stack 100. Each of the stacks 100 sits on an interface base 95 and is capped with a module stack cover 80. Each of the leftmost and rightmost stacks comprises four of the modules 50 of FIG. 6A stacked between the interface base 95 and the cover 80. The center stack comprises four of the modules 50 of FIG. 6A and one of the intermediate modules 612 of FIG. 6B; the intermediate module 612 is in the middle of the stack 100, with two of the modules 50 of FIG. 6A between it and the cover 80 and the other two of the modules 50 of FIG. 6A between it and the base 95. Each of the covers 80 comprises a return path 210 that connects the first electrically conductive path 608a to the second electrically conductive path 608b of the module 50 on which the cover 80 is sitting.

The first electrically conductive path 608a of the leftmost stack 100 and the second electrically conductive path 608b of the rightmost stack 100 are connected via first and fourth wires 618a,d to an electrical load (not shown). Similarly, the first and fourth electrically conductive paths 608a,d of the lowest module 50 in the center stack 100 are connected via second and third wires 618b,c to an electrical load (not shown). The second electrically conductive path 608b of the leftmost stack 100 is connected via a fifth wire 618e to the third electrically conductive path 608c of the lowest module 50 in the center stack. The second electrically conductive path 608b of the lowest module 50 in the center stack 100 is connected via a wire 618f to the first electrically conductive path 608a of the rightmost stack 100. The intermediate module 612 in the middle of the center stack 100 re-routes the first and second electrically conductive paths 608a,b of the top two modules 50 of the center stack 100 so that they are electrically in series with the leftmost stack 100 as opposed to the bottom two modules 50 of the center stack 100. Consequently, the leftmost stack 100 and the top two modules 50 of the center stack 100 are connected in series, and the rightmost stack 100 and the bottom two modules 50 of the center stack are connected in series, thereby making available to one or more electrical loads (not shown) two stacks 100 of six modules 50 in series. If the intermediate module 612 were replaced with another of the modules 50 of FIG. 6A, the configuration of FIG. 6C would result in two stacks 100 of four modules 50 and one stack 100 of five modules 100.

FIGS. 9A-9C depict various example configurations that are possible using a combination of the modules 50, 612 of FIGS. 6A and 6B. FIG. 9A shows three stacks 100 electrically connected together using an intermediate module 612 in the middle of the center stack 100 to create two groups of twelve modules 50 connected in series each, with the center stack 100 being split so that four of its modules 50 are grouped with the eight modules 50 from the leftmost stack 100 and four of its modules 50 are grouped with the eight modules 50 from the rightmost stack 100. FIG. 9B shows an analogous configuration in which three stacks 100 are electrically connected together using an intermediate module 612 in the middle of the center stack 100 to create two groups of thirteen modules connected in series each, with the center stack 100 again being split. FIG. 9C shows an analogous configuration used to create two groups of fourteen modules 50 each.

As represented in FIGS. 9A-9C, the intermediate module 612 need not have the same dimensions as the module 50 of FIG. 6A.

FIG. 8 depicts another example configuration that is possible using a combination of the modules 50, 612 of FIGS. 6A and 6B. In FIG. 8, the intermediate module 612 is located at varying positions in multiple stacks 100 so that different numbers of modules 50 may be grouped together in series. In the example configuration of FIG. 8, placing the intermediate module 612 directly on the second module 50 from the bottom (second stack 100 from the left), fifth module 50 from the bottom (third stack 100 from the left), and eighth module 50 from the bottom (third stack from the left) allows three groupings of twelve modules 50 in series and one grouping of ten modules 50 in series for a maximum height of 2.75 m.

FIGS. 10A-10D depict an example configuration of stacks 100 in which the intermediate module 612 is used (FIG.

Figure 10A:
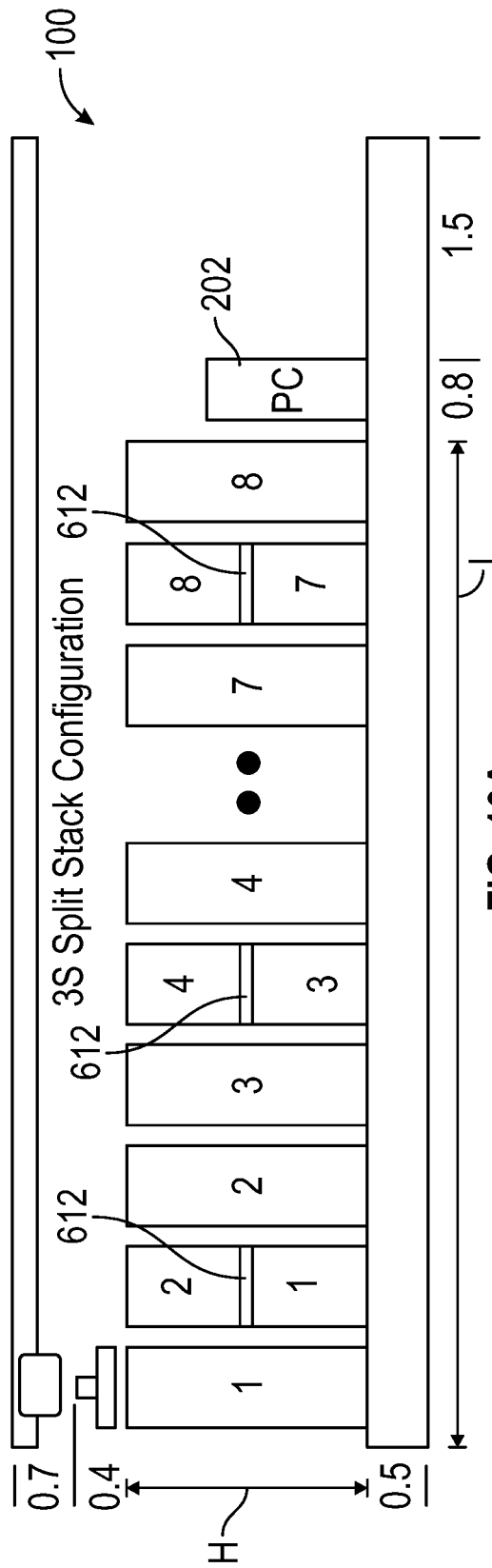
FIG. 10A depicts example stacks comprising the battery modules of FIGS. 6A and 6B.
Figure 10B:
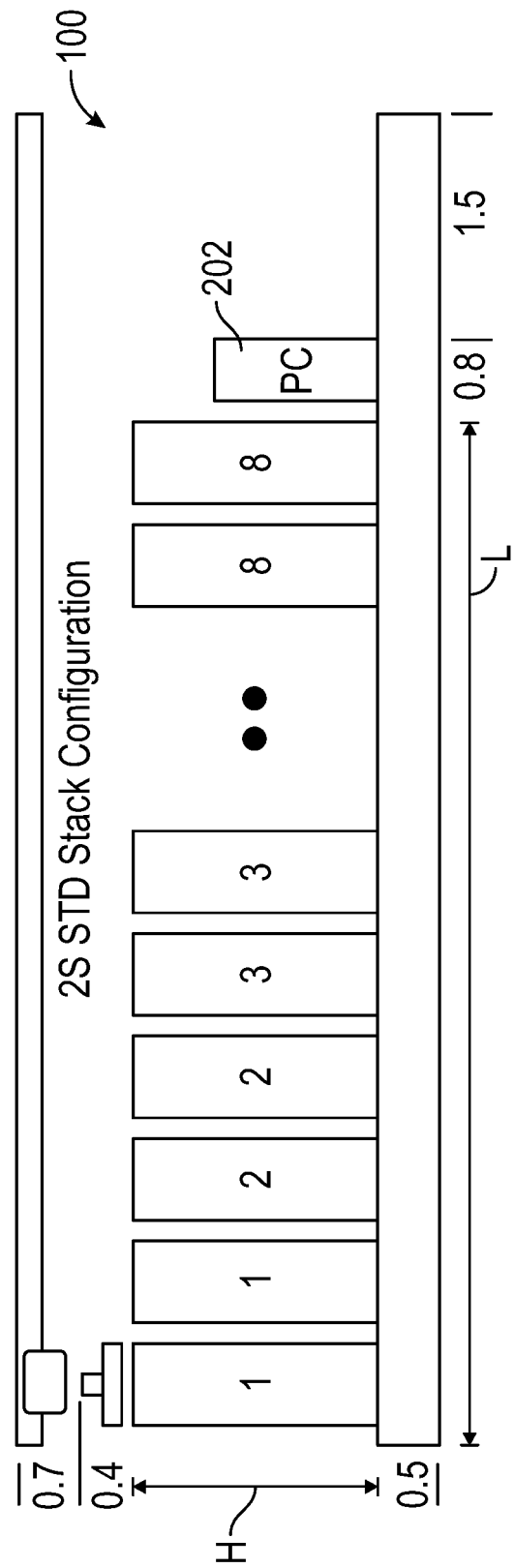
FIGS. 10B-10D depict example stacks comprising the battery module of FIG. 6A and omitting the battery module of FIG. 6B.
Figure 10C:
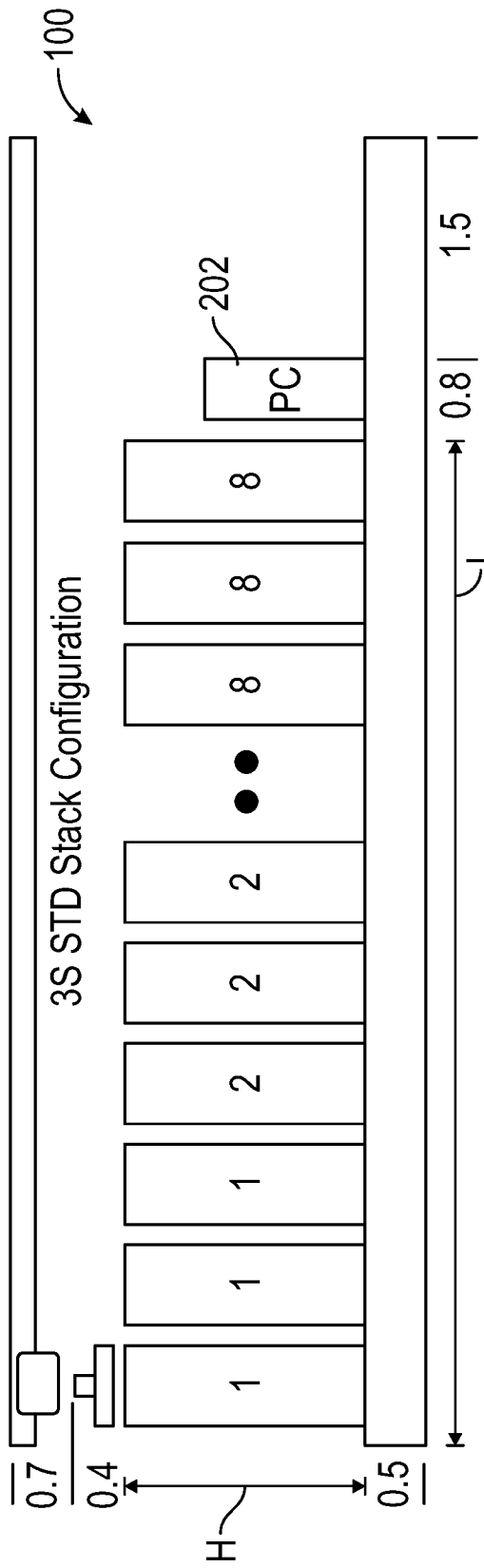
Figure 10D:
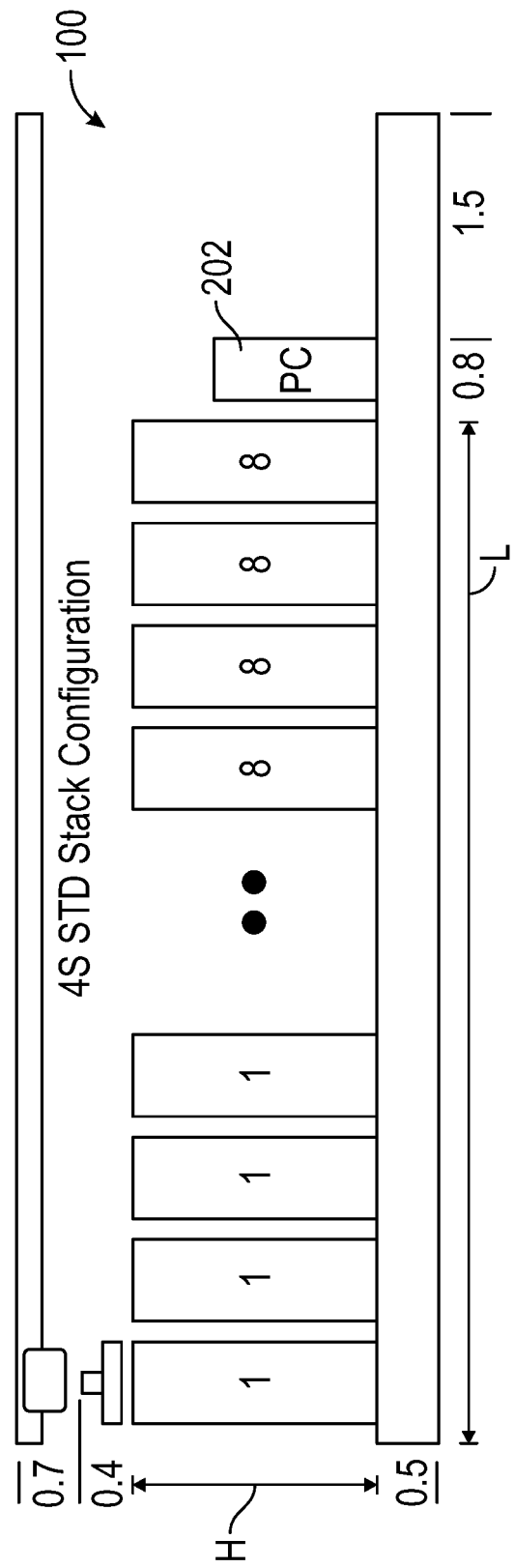

10A) vs. comparative configurations in which the intermediate module 612 is omitted (FIGS. 10B-10D). In each of FIGS. 10A-10D, the stacks 100 are presumed to have length L and height H. Length L and height H are not necessarily the same for each of the different configurations. The stacks 100 are connected to a pack controller 202 of length 0.8 m. The stacks 100 rest on a base of height 0.50 m that acts as an air plenum for the stacks 100, are capped by stack covers 80 of 0.4 m, and above the covers 80 the stacks require 0.7 m of clearance.

Each of the configurations of FIGS. 10A-10D represent eight groups of modules 50 in series, as labeled in those figures. However, their physical arrangement and the number of modules 100 in each of the stacks 100 differs. Each of the groups in the configuration of FIG. 10A ("3S Split Stack Configuration") is formed using modules 50 from 1.5 of the stacks 100, with the stacks 100 being split using the intermediate module 612 as necessary. In contrast, each of the groups in the configuration of FIG. 10B ("2S Standard Stack Configuration") is formed from the modules 50 of two full stacks 100 in series; each of the groups in the configuration of FIG. 10C ("3S Standard Stack Configuration") is formed from the modules 50 of three full stacks 100 in series; and each of the groups in the configuration of FIG. 10D ("4S Standard Stack Configuration") is formed from the modules of four full stacks 100 in series.

The main advantage of split stack configuration is to allow the flexibility to better fill any given installation location by decoupling system voltage and number of modules from the height of the installed system. It allows modules that are connected in series to be placed in adjacent stacks. This facilitates efficient use of the limited space that may be available for battery storage (e.g. on a marine vessel).

In at least some example embodiments, the electrically conductive paths 608a-e may be connected to switches that permit a single module 50, 612 to operate in different states. For example, a single module may, with its switches in a first state, operate as the battery module 50, and with its switches in a second state, operate as the intermediate module 612. More generally, one or both of the modules 50, 612 may comprise one or more switches that permit any one or more of the electrical contacts 606a-e, 604a-e to be routed to any other one or more of the electrical contacts 606a-e, 604a-e.

Additionally, while the example embodiments above place the electrical contacts 606a-e, 604a-e on the top and bottom sides of the modules 50, 612, in at least some example embodiments one or more of the electrical contacts 606a-e, 604a-e may be placed on one or more different sides of the modules 50, 612 (e.g., the left, right, front, or rear sides). Instead of stacking modules 50, 612 on top of each other, this permits modules to be laterally arranged and connected in a room. These lateral connections may be done using the bottommost modules 50, 612 (i.e., near the floor) or be made between any higher modules 50, 612.

In the figures, the battery module 50 and the intermediate module 612 are shown as distinct modules. In at least some different example embodiments, the modules may be combined into the same housing so that a single module has the functionality of both the battery module 50 and intermediate module 612 described above.

While described in conjunction with conducting power through the modules the electrically conductive paths 608a-e and/or additional electrically conductive paths not depicted in the figures may additionally or alternatively be used to conduct other digital or analog signals. These signals may be used, for example, for communicating between the modules 50, 612 and the pack controller 202. The modules 50, 612 may use the electrically conductive paths to simply relay or passively pass or conduct digital or analog signals received from one of the modules 50, 612 to another of the modules 50, 612. Alternatively, the modules 50, 612 may include circuitry that repeats and/or switches those digital or analog signals between different electrically conductive paths. In at least some example embodiments, an optically transmissive path may be used in addition to or as an alternative to the electrically conductive paths 608a-e. The optically transmissive path may comprise optical fiber, for example; the electrical contacts on the module 50, 612 housing may accordingly comprise a fiber optic coupler or adapter, or a fiber optic transmitter/receiver/transceiver.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification. For example, and without limiting the generality of the foregoing, the teachings in this disclosure in respect conducting power or signals between the top and bottom of modules may be applied to conducting power or signals between any other sides of the modules.

The invention claimed is:

1. A battery module comprising:
   (a) a housing that is electrically conductive;
   (b) two or more battery cells contained within the housing and electrically connected to each other;
   (c) a first top electrical contact, a second top electrical contact, a third top electrical contact, a fourth top electrical contact, and a fifth top electrical contact located on a top side of the housing;
   (d) a first bottom electrical contact, a second bottom electrical contact, a third bottom electrical contact, a fourth bottom electrical contact, and a fifth bottom electrical contact located on a bottom side of the housing; and
   (e) a first electrically conductive path terminating at the first top electrical contact and the first bottom electrical contact and is electrically connected in series to the two or more battery cells, a second electrically conductive path terminating at the second top electrical contact and the second bottom electrical contact, a third electrically conductive path terminating at the third top electrical contact and the third bottom electrical contact, and a fourth electrically conductive path terminating at the fourth top electrical contact and the fourth bottom electrical contact, wherein the fifth top electrical contact and the fifth bottom electrical contact are electrically connected to the housing.

2. The battery module of claim 1, further comprising a fifth electrically conductive path terminating at the fifth top electrical contact and the fifth bottom electrical contact.

3. The battery module of claim 1, further comprising a male connector on one of the top side or the bottom side of the housing and a female connector on the other of the top side or the bottom side of the housing,
   wherein at least one of the first top electrical contact, the second top electrical contact, the third top electrical contact, the fourth top electrical contact, or the fifth top electrical contact terminates at the male connector or the female connector on the top side of the housing, and at least one of the first bottom electrical contact, the second bottom electrical contact, the third bottom electrical contact, the fourth bottom electrical contact, or the fifth bottom electrical contact terminates at the male connector or the female connector on the bottom side of the housing.

4. The battery module of claim 3, wherein each of the first top electrical contact, the second top electrical contact, the third top electrical contact, the fourth top electrical contact, and the fifth top electrical contact terminate at the male connector or the female connector on the top side of the housing, and each of the first bottom electrical contact, the second bottom electrical contact, the third bottom electrical contact, the fourth bottom electrical contact, and the fifth bottom electrical contact terminate at the male connector or the female connector on the bottom side of the housing.

5. An intermediate module for electrically connecting a top battery module as claimed in claim 1 with a bottom battery module as claimed in claim 1 when the intermediate module is stacked between the top battery module and the bottom battery module, the intermediate module comprising:
(a) a housing having a top side and a bottom side, opposite the top side;
(b) a first top electrical contact and a second top electrical contact located on the top side;
(c) a first bottom electrical contact and a second bottom electrical contact located on the bottom side; and
(d) a first electrically conductive path terminating at the first top electrical contact and the first bottom electrical contact and a second electrically conductive path terminating at the second top electrical contact and the second bottom electrical contact,
wherein the first top electrical contact of the intermediate module is positioned to contact the first bottom electrical contact of the top battery module, the first bottom electrical contact of the intermediate module is positioned to contact the third top electrical contact of the bottom battery module, the second top electrical contact of the intermediate module is positioned to contact the second bottom electrical contact of the top battery module, and the second bottom electrical contact of the intermediate module is positioned to contact the fourth top electrical contact of the bottom battery module.

6. The intermediate module of claim 5, further comprising two or more battery cells contained within the housing and electrically connected to each other, wherein the first electrically conductive path is electrically connected in series to the two or more battery cells.

7. The intermediate module of claim 5, further comprising:
(a) a third bottom electrical contact and a fourth bottom electrical contact located on the bottom side of the housing; and
(b) a third electrically conductive path terminating at the third bottom electrical contact and the fourth bottom electrical contact,
wherein the third bottom electrical contact of the intermediate module is positioned to contact the first top electrical contact of the bottom battery module, and the fourth bottom electrical contact of the intermediate module is positioned to contact the second top electrical contact of the bottom battery module.

8. The intermediate module of claim 5, further comprising a male connector on one of the top side or the bottom side of the housing of the intermediate module and a female connector on the other of the top side or the bottom side of the housing of the intermediate module,
wherein at least one of the first top electrical contact or the second top electrical contact of the intermediate module terminates at the male connector or the female connector on the top side of the housing of the intermediate module, and at least one of the first bottom electrical contact or the second bottom electrical contact of the intermediate module terminates at the male connector or the female connector on the bottom side of the housing of the intermediate module.

9. The intermediate module of claim 8, wherein the first top electrical contact and the second top electrical contact of the intermediate module terminate at the male connector or the female connector on the top side of the housing of the intermediate module and the first bottom electrical contact and the second bottom electrical contact of the intermediate module terminate at the male connector or the female connector on the bottom side of the housing of the intermediate module.

10. A stack of battery modules, comprising:
(a) a top battery module as claimed in claim 1;
(b) a bottom battery module as claimed in claim 1; and
(c) an intermediate module stacked between the top battery module and the bottom battery module, the intermediate module comprising:
(i) a housing having a top side and a bottom side, opposite the top side;
(ii) a first top electrical contact and a second top electrical contact located on the top side;
(iii) a first bottom electrical contact and a second bottom electrical contact located on the bottom side; and
(iv) a first electrically conductive path terminating at the first top electrical contact and the first bottom electrical contact and a second electrically conductive path terminating at the second top electrical contact and the second bottom electrical contact,
wherein the first top electrical contact of the intermediate module is positioned to contact the first bottom electrical contact of the top battery module, the first bottom electrical contact of the intermediate module is positioned to contact the third top electrical contact of the bottom battery module, the second top electrical contact of the intermediate module is positioned to contact the second bottom electrical contact of the top battery module, and the second bottom electrical contact is positioned to contact the fourth top electrical contact of the bottom battery module.

11. The stack of claim 10, wherein the intermediate module further comprises:
(a) a third bottom electrical contact and a fourth bottom electrical contact located on the bottom side of the housing; and
(b) a third electrically conductive path terminating at the third bottom electrical contact and the fourth bottom electrical contact,
wherein the third bottom electrical contact of the intermediate module is positioned to contact the first top electrical contact of the bottom battery module, and the fourth bottom electrical contact of the intermediate module is positioned to contact the second top electrical contact of the bottom battery module.

12. The stack of claim 10, wherein the intermediate module further comprises a male connector on one of the top side or the bottom side of the housing of the intermediate module and a female connector on the other of the top side or the bottom side of the housing of the intermediate module, and wherein at least one of the first top electrical contact or the second top electrical contact of the intermediate module terminates at the male connector or the female connector on the top side of the housing of the intermediate module and at least one of the first bottom electrical contact or the second bottom electrical contact of the intermediate module terminates at the male connector or the female connector on the bottom side of the housing of the intermediate module.

13. The stack of claim 12, wherein the first top electrical contact and the second top electrical contact of the intermediate module terminate at the male connector or the female connector on the top side of the housing of the intermediate module, and the first bottom electrical contact and the second bottom electrical contact of the intermediate module terminate at the male connector or the female connector on the bottom side of the housing of the intermediate module.

\* \* \* \* \*